United States Patent [19]
Opitz

[11] 4,053,891
[45] Oct. 11, 1977

[54] RADAR OBJECT DETECTOR USING NON-LINEARITIES

[75] Inventor: Charles L. Opitz, Westfield, NJ

[73] Assignee: Lockheed Electronics Company, Plainfield, N.J.

[21] Appl. No.: 642,657

[22] Filed: May 24, 1967

[51] Int. Cl.² .............................................. G01S 9/02
[52] U.S. Cl. ................................................ 343/5 SA
[58] Field of Search ...................... 343/5, 6.5, 6.5 SS, 343/6.8, 5 SA

[56] References Cited

U.S. PATENT DOCUMENTS

| 2,712,646 | 7/1955 | Lawson et al. | 343/5 |
| 2,773,253 | 12/1956 | Sunstein | 343/5 |

Primary Examiner—Malcolm F. Hubler
Attorney, Agent, or Firm—Billy G. Corber

[57] ABSTRACT

A radar object locator having a transmitter radiating carrier energy in at least one band of frequencies and a receiver tuned to a frequency different from that radiated by the transmitter whereby only a frequency band of carrier energy produced by the electrical non-linearity characteristics of particular objects is detected by the receiver.

5 Claims, 2 Drawing Figures

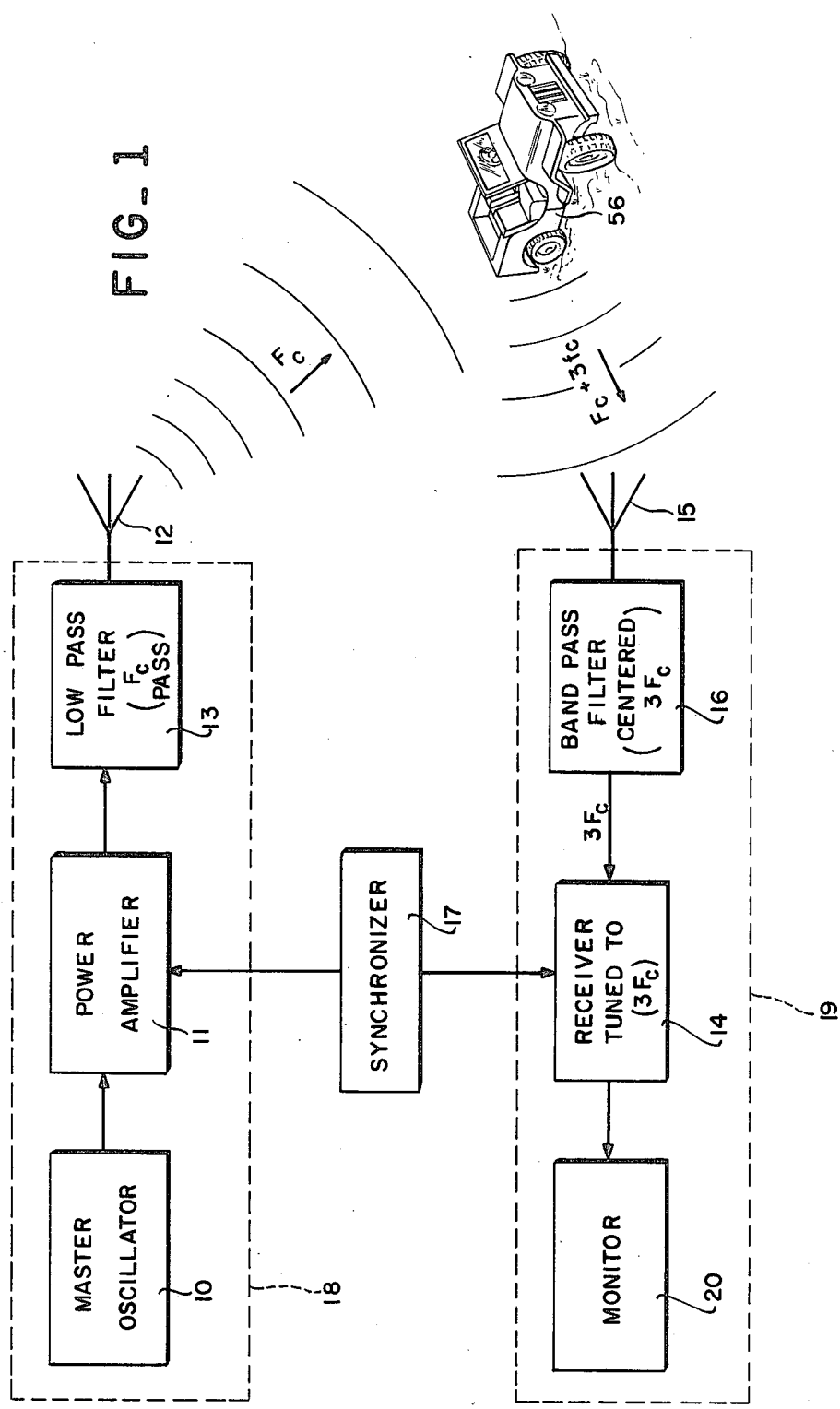

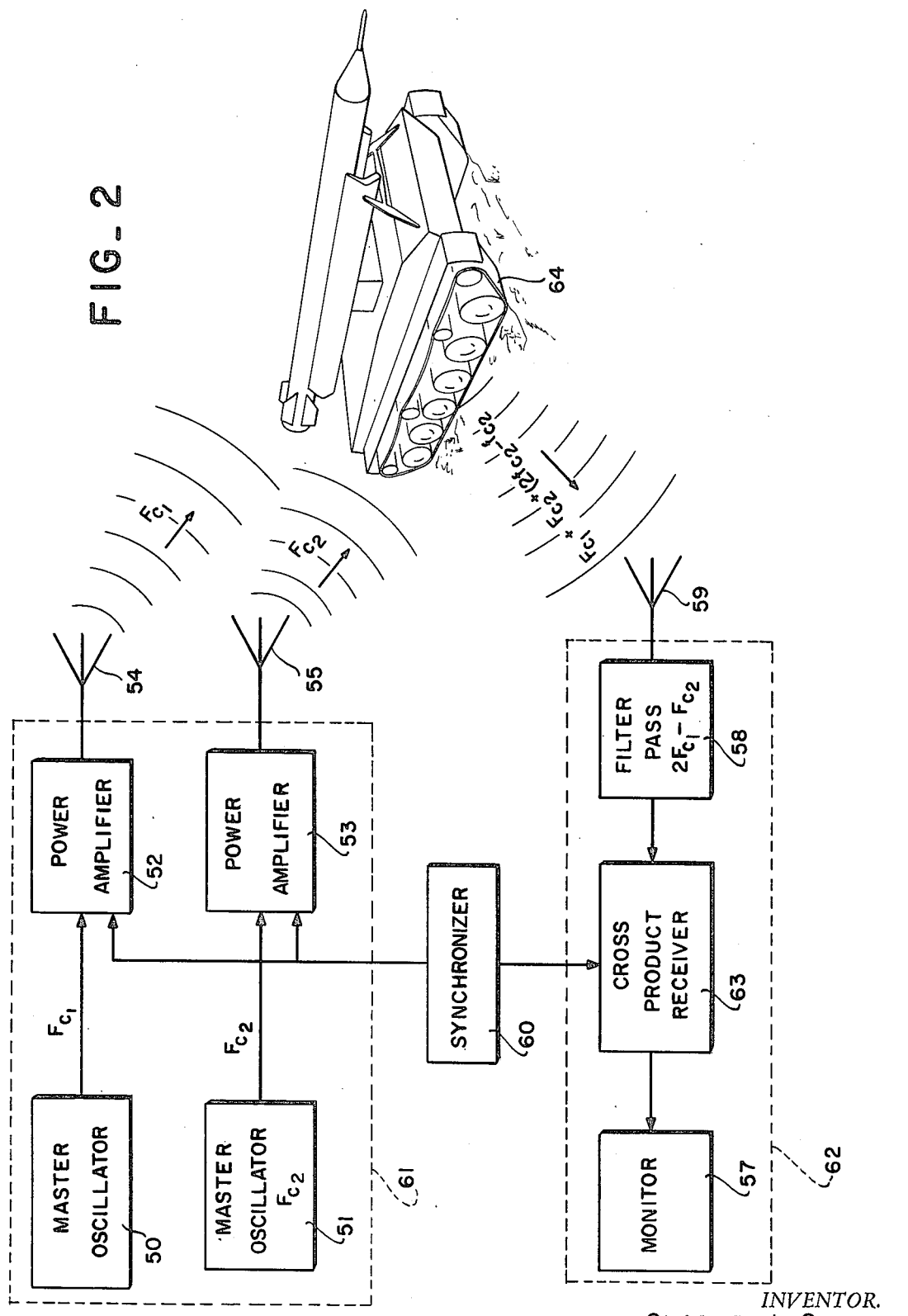

RADAR OBJECT DETECTOR USING NON-LINEARITIES

This invention relates generally to radar and more particularly to a radar object detector using non-linearities for target recognition and suppression of natural background return.

Conventional radar systems transmit and receive electromagnetic energy on the same frequency. Most material in solid objects such as boats, water, trees, earth, etc. reflects the radar frequency (rf) carrier back to the radar receivers with nearly equal facility. When a desired target such as a truck or gun is close to and/or surrounded by undesired targets such as trees and terrain, the return from the desired target can be hopelessly masked by the return from the other undesired targets in the area illuminated by the radar beam. If the desired target cannot be separated on the basis of very high angular and/or range resolution (with relative motion) it is nearly impossible to detect.

Compound metallic objects having two or more separate metallic components such as man made objects having different base metals, a base metal and an oxide coating, semi-conductor compounds and the like which are joined imperfectly in an electrical (radio frequency) sense are known to exhibit non-linear electrical characteristics. That is, when such objects are illuminated with one or more electromagnetic carrier frequencies, a small but significant portion of the original exciting energy is converted to a new frequency. It is a primary object of this invention to provide a method and means which takes advantage of this unique artifact characteristic for remote detection of such man made objects as arms and ammunition, ground vehicles, dwellings with metallic appliances, fixtures or structures, aircraft and missiles, ships and boats of metal or containing metal in fixture or cargo, industrial equipment (pipe, fences, machinery, etc.), bridges, power lines, etc., and electronic equipment (radios, test equipment, etc.). By illuminating such a target with electromagnetic energy at one or more frequencies, and detecting only the frequency from the object to the exclusion of background energy including the original existing signal, reflections from all but the compound metallic object in the target area are rejected.

Since the device of this invention depends on non-linearity characteristics of a target for discriminating against background reflections rather than on angular or range resolution capabilities, electromagnetic energy at much lower radio frequencies than with conventional radar may be employed. With lower frequencies and longer wavelengths, several distinct advantages accrue:

1. There is greater penetration through foliage, dry soils, water, etc. to permit detection of metallic objects otherwise invisible on the earth's surface; and
2. Compound metallic objects of very small size can be rejected or distinguished from larger objects on the basis of return signal frequency and amplitude.

There enumerated advantages represent other objects of this invention.

Further and other objects will become apparent from a reading of the following detail description, especially when considered together with the accompanying drawing wherein like numerals refer to like parts. In the drawing:

FIG. 1 is a block diagram of one form of the invention.

FIG. 2 is a block diagram of a second form of the invention.

Referring to FIG. 1, a single frequency system is shown wherein a carrier frequency ($f_c$) is obtained from a master oscillator 10. The output of the oscillator is applied to a power amplifier 11 which may be of the gated type to form a pulsed carrier in the output.

The third harmonic ($3 F_c$) is preferably supressed by balance operation of the power amplifier and sebsequently substantially totally removed from the outgoing signal to antenna 12 by a high level, low pass filter 13. The remainder of the energy is radiated via antenna 12 to impinge upon a selected object such as 56 under surveillance.

Receiver 14 in the FIG. 1 system is coupled to antenna 15 through a radar frequency filter 16 which rejects the carrier frequency $F_c$ and only passes the third harmonic ($3 F_c$) and associated side bands. Although a single broadband antenna could be used, separate transmitter and receiver antennas are shown for clarity.

Synchronizer unit 17 synchronizes transmitter section 18 and receiver section 19 and controls the gating on and off of the transmitter and receiver in a system utilizing pulse techniques. Although a continuous wave version of the FIG. 1 system would be useful in short range applications, longe range operation would normally demand the use of the described pulse technique so that local non-linearity generated signals associated with the system itself can be range gated out.

Monitor 20 may be of the usual cathode ray tube type. Target bearing and range can, of course, be ascertained in the same manner as conventional radar systems.

The alternate system configuration shown in FIG. 2 includes a transmitter section 61 having two master oscillators 50 and 51 each generating a carrier signal, one at a frequency ($F_{c_1}$) and the other at a frequency ($F_{c_2}$), displaced from each other a controlled amount. The outputs from the oscillators 50 and 51 are applied to power amplifiers 52 and 53, respectively, for driving antennas 54 and 55. The radiated energy illuminates the compound metal object 64 in the target area and causes the object non-linearities to serve as a mixer for the two exciting frequencies, thereby generating new cross product frequencies. Receiver 63 in the receiver section 62 is tuned to one of the strongest cross product frequencies and its output applied to a suitable display monitor 57 such as a conventional cathode ray tube radar display.

A band pass filter 58 in receiver section 62 is preferably coupled between receiving antenna 59 and receiver 63 to suppress signals of unwanted frequency as in the FIG. 1 configuration. Also similarly to the single frequency system of FIG. 1, a synchronizer unit 60 may be employed for a pulse or phase-locked system.

In the dual frequency system of FIG. 2, existing frequencies $F_{c_1}$ and $F_{c_2}$ are best chosen so that they are not harmonically related to the new cross product frequency of interest generated by the target. This allows the high level output filter 13, as in the FIG. 1 system, to be eleminated and reduces the requirements for a low level band pass filter such as 58 in FIG. 2.

Operation of the described radar systems is basically the same. Carrier energy in one or more frequency bands is generated from the transmitter section 18 or 61 and directionally radiated to a metal object such as 56 or 64 in a target area. The non-linearities in the illuminated object generate a new frequency which is detected by the receiver section 19 or 62 and displayed on monitor 20 or 57. Since it is the new frequency signal which is operated on by the receiver section instead of the transmitted frequency return signal as in a conventional radar, background clutter from natural objects such as trees, earth, water, etc. is automatically rejected.

It is possible to enhance the non-linear effect of a target by maximizing the voltage across the non-linear junctions. The high electrical conductivity and finite length factors of most metal artifacts can be made to resonate or at least to have some standing wave pattern which greatly increases the voltage across the junctions. Natural objects generally are of considerably greater length than most man made metal artifacts and are also relatively poor radio frequency conductors. Thus, such targets can be effectively distinguished one from the other by their substantially differing "Q" or gain increase factors.

By optimizing the wavelength of the carrier energy for a particular target, the radar device of this invention can be made to discriminate, not only between natural objects and man made metal artifacts, but also between different metal artifacts. In practice, the carrier wavelength should be no longer than about twice the length of the desired target.

The radar carrier frequency may of course be frequency modulated, if desired, to optimize the return from a target of unknown characteristics or to distinguish between several different targets. In this case the output signal from the transmitter section such as 18 or 61 is swept in frequency with the receiver section 19 or 62.

The two embodiments of the radar device disclosed herein, in the interests of clarity, exclude circuit details common to conventional radar systems. Further in this connection, it is to be understood that the two embodiments are given by way of illustration rather than limitation and that certain alterations, modifications and substitutions may be made to the instant disclosure without departing from the teachings of the invention as defined by the spirit and scope of the appended claims.

I claim:

1. A radar device for remotely detecting compound metal objects comprising, oscillator means for generating electromagnetic energy in at least one band of frequencies, antenna means for transmitting said energy in a beam toward said compound metal object, and receiver means tuned to a predetermined functionally related frequency band different from the first mentioned band of frequencies for detecting only that which is produced by the electrical non-linearity characteristics of the object.

2. A device as defined in claim 1 including means coupled between said oscillator means and said antenna means for suppressing frequencies in said predetermined frequency band, and filter means coupled to said receiver means passing only frequencies within said predetermined frequency band.

3. A device as defined in claim 1 including filter means coupled to said receiver means and passing only frequencies with said predetermined frequency band.

4. A device as defined in claim 1 wherein the receiver means is tuned to the third harmonic of the transmitted energy.

5. A device as defined in claim 1 wherein the oscillator means includes a pair of signal generators for producing electromagnetic energy at two frequencies displaced one from the other, synchronizer means maintaining a controlled phase relationship between the two frequencies, and filter means associated with said receiver means for passing only a cross product frequency of the two frequencies displaced one from the other.

* * * * *